Jan. 30, 1968 P. W. STUMP 3,366,493
MULTIPLE PLY SPIRAL WOUND CONTAINER
Filed Oct. 11, 1965 2 Sheets-Sheet 1
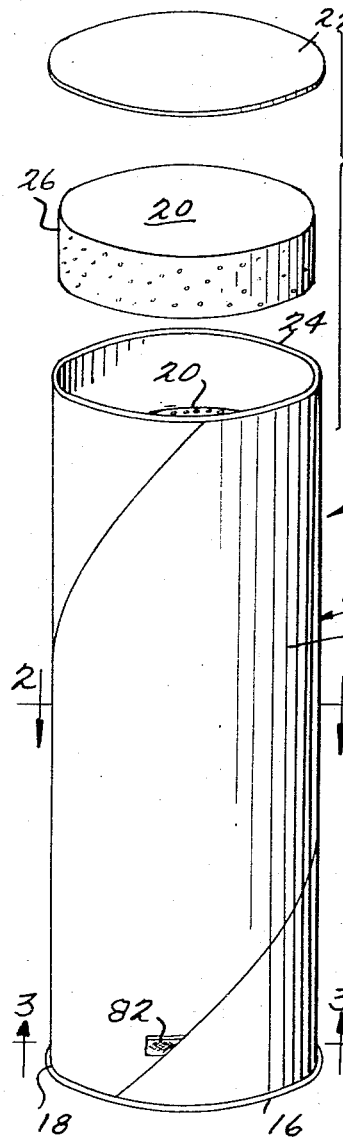
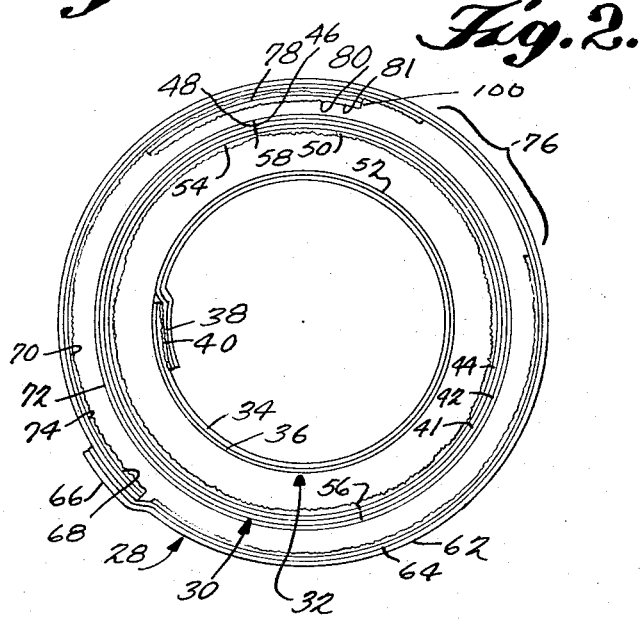
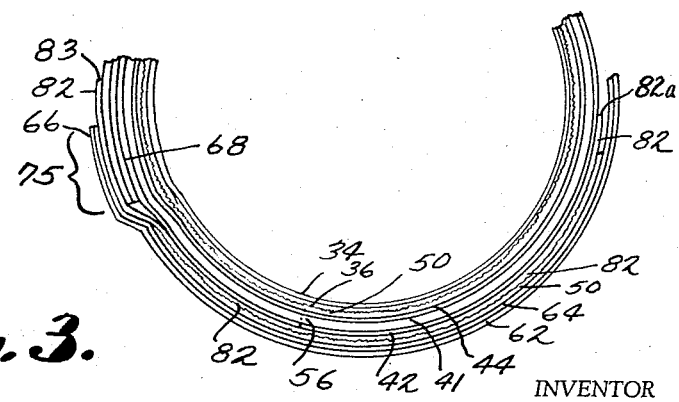
INVENTOR
PAUL W. STUMP
BY Cushman, Darby & Cushman
ATTORNEYS Jan. 30, 1968
P. W. STUMP
3,366,493
MULTIPLE PLY SPIRAL WOUND CONTAINER
Filed Oct. 11, 1965
2 Sheets-Sheet 2
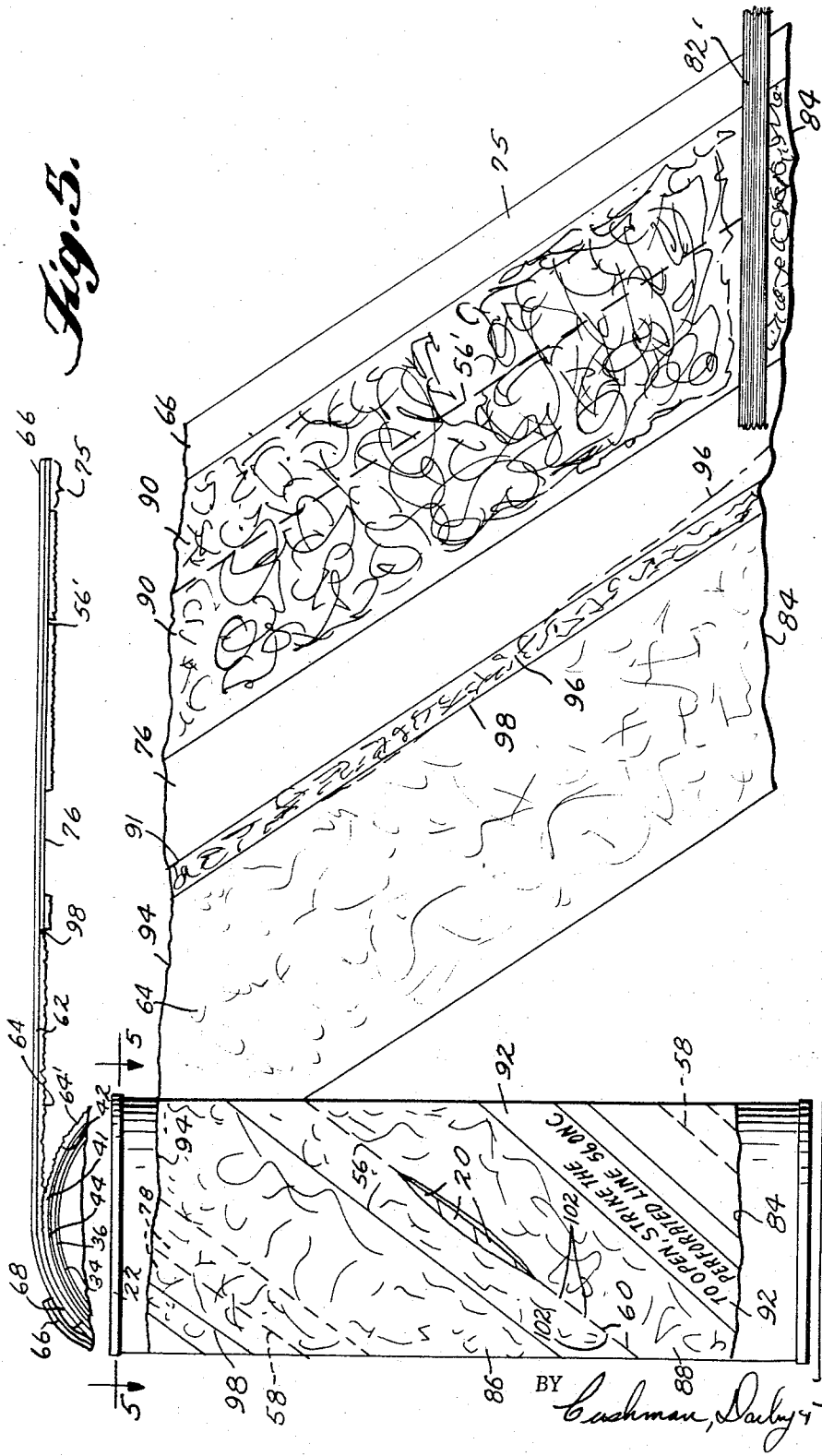
INVENTOR
PAUL W. STUMP
BY Cushman, Darby & Cushman
ATTORNEYS

United States Patent Office

3,366,493
Patented Jan. 30, 1968

3,366,493
MULTIPLE PLY SPIRAL WOUND CONTAINER
Paul W. Stump, North Olmsted, Ohio, assignor to Cleveland Container Corporation, New York, N.Y., a corporation of Delaware
Filed Oct. 11, 1965, Ser. No. 494,745
10 Claims. (Cl. 99—172)

ABSTRACT OF THE DISCLOSURE

A spiral wound container having a removable label, a body and an inner liner wherein the body is spirally perforated from the inner peripheral surface thereof which allows the container body and liner to be broached along an even spiral line.

The body is provided with sufficient resistance to bursting by the provision of a reinforcing strip bridging the butt joint of the body which remains in place as the label is removed that the spirally wound label need not be comprised of material having an exceptionally high tensile strength.

The foregoing abstract is not intended to be a comprehensive discussion of all of the principles, possible modes or applications of the invention disclosed in this document and should not be used to interpret the scope of the claims which appear at the end of this specification.

---

The present invention relates to multiple ply spiral wound fillable containers; containers; and packages, specifically of the type popularly employed to merchandise unbaked dough products such as biscuit dough patties.

Seen in its more complete aspect, however, the principles of the present invention relate to containers for other edible products than dough for instance, confections, and to other products than comestibles, for instance spark plugs could be merchandised in containers constructed according to the principles of the present invention.

The major considerations in designing spiral wound containers are that they should not damage the contained product, should be strong enough to reach the consumer in an intact condition, should have as low a cost as possible consistant with the first two requirements and should be easily openable by the average consumer without special training as well as exteriorly attractive.

It is the primary object of the present invention to provide a container which satisfies each of the above considerations.

A further object of the present invention is the provision of containers of the type described which are stronger yet cost no more and open more easily than presently available packages of the same class.

Another object of the invention is the provision of a spiral wound container having a removable label, a body and an inner liner wherein the body is spirally perforated from the inner peripheral surface thereof which allows the container body and liner to be broached along an even spiral line.

Yet another object of the invention is the provision of a container of the type described wherein the body is provided with sufficient resistance to bursting by the provision of a reinforcing strip bridging the butt joint of the body which remains in place as the label is removed that the spirally wound label need not be comprised of material having an exceptionally high tensile strength. For instance, a paper label can be used rather than a foil paper laminate label, or a lighter than usual weight foil label may be employed.

These and other objects of the present invention as well as the principles and scope of advantageous applicability thereof will become more clearly apparent during the course of the following detailed explanation which relates to the preferred embodiment of the invention that is shown in the attached drawings.

In the drawings:

FIGURE 1 is a side elevation view of a container according to the present invention being filled with biscuit dough patties prior to being lidded;

FIGURE 2 is an exploded fragmentary transverse cross-sectional view of the container of FIGURE 1, taken substantially along the line 2—2 of FIGURE 1;

FIGURE 3 is a fragmentary transverse cross-sectional view of the container of FIGURE 1, taken substantially along the line 3—3 of FIGURE 1;

FIGURE 4 is a side elevation view of the filled and lidded container with the label nearly completely unwrapped and showing the intermediate wall and liner burst along the spiral perforation line exposing biscuit dough patties for removal from the container; and FIGURE 5 is a transverse cross-sectional view substantially along the line 5—5 of FIGURE 4, taken before the intermediate wall and liner are burst.

Thickness of the plies is exaggerated in FIGURES 2, 3 and 5 so that various aspects of the present invention can be more distinctly pointed out.

A fillable container 10 according to the present invention is shown in FIGURE 1 having a multiple ply spirally wound tubular peripheral wall 12 which includes an exteriorly decorative spirally wound removable label 28. A disk-shaped enclosure 16 is secured by crimping or other conventional means to one end 18 of the wall 12 to provide a bottom for the container. It has been generally found most efficient among fabricators and fillers of spirally wound containers, for the fabricator to supply the containers to the filler with one closure, the bottom, on the container. The fillable container 10 having one end 18 closed could therefore be considered a finished product as respects the fabricator. After filling the container 10 with a product such as unbaked biscuit dough patties 20, the filler then closes the container by crimping or otherwise securing a disk-shaped closure 22 to opposite end 24 of the peripheral wall 12 to define a product package.

The packaging of unbaked dough products, particularly biscuit dough patties, presents unique problems which are solved with particular efficiency by the present invention. In particular, biscuit dough patties usually contain baking powder or a similar delayed action leavening agent. In order to facilitate depositing of the patties in the containers, the patties are usually cut so as to have a slightly smaller diameter than the container internal diameter. After the patties are in the cans, generation of leavening gas by the leavening agent causes the patties to rise or "proof" so that the peripheral cut edges 26 of the biscuit patties are in stressed contact with the inner peripheral surface of the containers. This action, in combination with an oil film which is often applied to the edges 26 and/or the inner peripheral surface of the container prevents leavening gas from escaping from the patties through the cut edges.

As can best be seen in FIGURES 2–5, the spirally tubular wound peripheral wall 12 of the container 10 comprises a spirally wound tubular label 28, a spirally wound tubular body 30 and a spirally wound tubular liner 32. The body 30 is adhered to and tightly wound about the liner 32 and the label 28 is removably adhered to and tightly wound about the body 30. The peripheral wall 12 may be formed continuously by winding plies of indeterminant length to which adhesive is applied about a stationary mandrel and severing the tube into desired lengths with conventional flying saw means as will be understood by those familiar with the art.

The spirally wound tubular liner 32 is shown having two coextensive plies 34 and 36 intimately bonded to one another. The radially inner ply 34 may advantageously comprise metal foil such as aluminum foil, thermoplastic film and in certain instances glassine or vegetable parchment or the like. The radially outer ply 36 may comprise a thin layer of natural kraft paper or the like. The spiraled strip which forms the liner 32 is secured to itself along a spiraling lapped joint 38 by an adhesive 40 which is relatively oil-proof and water proof, especially when an unbaked dough product is to be contained, in order to prevent leakage from the container and consequent damage to the product. Suitable adhesives will be apparent to those skilled in the art, for instance after perusing "Modern Packaging" volume 38, No. 3A, November 1964, pages 192–197.

The spirally wound tubular body 30 provides stiffness and integrity to the container 10. Typically, the body 30 is a laminate comprising one or more central plies of chip board 41, a thin top news liner 42 having relatively short fibers and a thin inner liner of natural kraft 44. One reason for providing a plurality of plies in the body 30 is so that relatively inexpensive paper having poor bending qualities can be used. The various plies of the body 30 or several of them could be united on the mandrel. In more expensive containers 10, a single ply body 30 having better bending qualities could be used.

The spiralled strip which forms the body 30 is butted against itself along its lateral margins 46, 48 and a continuous layer of adhesive 50 is interposed between the tubular liner 32 radially outer peripheral surface 52 and the tubular body 30 radially inner peripheral surface 54. The adhesive may be applied to either of the surfaces 52, 54. As illustrated in FIGURE 2, the adhesive 50 has been applied to the surface 54.

It should be now be noticed that the body 30 is partially perforated along a spiral perforation line 56 that is parallel to the abutting margins 46 and 48. Preferably the perforation line 56 is angularly spaced substantially from the butt joint 58 to avoid confusion on the part of the consumer regarding where the container is to be opened. The perforation line 56 is also angularly spaced from the lapped joint of the liner. As shown, the perforation line 56 is approximately diametrically opposed to the butt joint 58.

The individual perforations 60 are preferably cut into the body 30 from the kraft side thereof so the perforations will be cleaner and sharper on the side of the body which is adjacent the container liner 32 for reasons to become apparent.

The label 28 is shown having two coextensive plies 62 and 64 intimately bonded to one another. The outer ply 62 may advantageously comprise metal foil, thermoplastic film or high quality paper to which decorative, motivational and/or instructive indicia (not shown) is applied by printing, photography or similar techniques. The inner ply 64 may comprise a thin layer of natural kraft paper or the like. The label 28 may be a single ply in the container of the present invention since unlike many prior art spiral wound container labels the label 28 primarily serves a decorative motivational and/or instructive function and a break-line protective covering function rather than primarily a reinforcing function.

The spiralled strip which forms the label 28 is of sufficient width that when tightly spirally wound about the body 30 the lateral edges 66, 68 of the label form an overlap and an underlap respectively.

An adhesive 70 interposed between the outer peripheral surface 72 of the body and the inner peripheral surface 74 of the label is used to detachably secure the label 28 to the body 30. As shown, the adhesive has been applied to the surface 74, but it could alternatively be applied to the surface 72. The layer of adhesive 70 is not continuous with respect to the entire surface 74 as can be seen from FIGURES 2, 3 and 4. Specifically, the label area between the overlap and underlap 66, 68 is left dry at 75 and a dry strip 76, parallel to the edges 66 and 68 and of approximately 45 degrees in transverse cross-sectional arcuate extent, is provided intermediate the edges of the label.

Before the label 28 is adhered to the body 30, a reinforcing strip 78 of natural kraft paper or the like is interposed between the body and label so as to centrally overlie the butt joint 58 and adhesive 80 interposed between the reinforcing strip 78 and the one of the surfaces 72 and 74 which does not have the adhesive 70 applied thereto.

In FIGURE 2 it can be seen that the adhesive 80 has been applied to the inner face 81 of the reinforcing strip 78, the adhesive 80 could have been applied to the body surface 72. In any event the bonding strength of the adhesive layers 70 and 80 and resistance of the plies 42, 78 and 64 to layering is such that, after the plies have been wound one upon the other and adhered to one another, unwinding of the label from the body will result in the reinforcing strip remaining strongly adhered to the body surface 72 bridging the butt joint 58. The reinforcing strip 78 radially restrains the body 30 and liner 32 from bursting or unwinding about the butt joint 58. The choice of adhesives, if not readily apparent to those skilled in the art, would become so upon reference to the above-mentioned "Modern Packaging" article.

The container 10 is completed by a pull-open tab 82 of ribbon fabric or the like such as rayon, or thermoplastic film or the like. The tab 82 is positioned between the label 28 and the body 30 near one end of the container. The tab 82 has one end 83 as best seen in FIGURE 3 which extends out from between the label 28 and body 30 between the underlap and overlap of the label. The opposite end 82a of the tab 82 is located radially inwardly of and abuttingly adjacent the dry strip 76. It can be seen that the tab 82 extends less than circumferentially of the container, for instance about halfway therearound. The tab 82 is secured to the radially inner peripheral surface of the label 28.

The container 10 has been depicted in FIGURES 1 and 4 as if the tab 82 were adjacent the bottom of the container and could be pulled outwardly and counterclockwise to peel the label from the container. After a moments reflection, it should be apparent that, after the two disk-like ends of the container are in place, it is often immaterial which end is the bottom so that the container 10 could be opened by inverting it from its FIGURE 1 position and pulling the tab 82 outwardly and clockwise. The package fabricator has some degree of control over the orientation of the container when the label is being unwound by the consumer in the fabricator's selection of the orientation of the indicia on the outer surface of the label.

In any event as the protruding portion of the tab 82 is grasped and pulled away from the body the label 28 will begin ripping generally circumferentially of the container between the tab 82 and the nearest container end closure along a line 84. Because it is not adhered to the label underlap 68, the overlap 66 will separate cleanly from the underlap. When the label is unwound from the portions 86 and 88 of the news liner ply of the body 10 to which it was directly adhered, some of the fibers of the news liner 42 will separate from the body 30 with the adhesive and will remain on the label as indicated at 90. However, the outer surface of portion 92 of the news liner 42 which underlay the dry strip 76 will remain intact. Advantageously, instructions for broaching the body 30 and inner liner 32 to remove the container contents can be printed on the body surface portion 92 as seen in FIGURE 4.

When removal of the label has progressed to the point where the label overlap 66 has been nearly completely separated from the label underlap 68, the label 28 will begin to tear generally circumferentially, for instance along the line 94 adjacent the end closure 22.

It is of importance to note that the tab 82 crosses and terminates beyond the perforation line 56. (An indication of the location of the perforation line 56 may be visible on the inner side of the peeled label at 56' because of the adherence of newsliner fibers 90 to the label.) Accordingly, even if the label were to rip in an undesired fashion, for instance along the phantom line 96, after the dry strip 76 has been reached, the perforation line 56 as well as the instructions on the body surface portion 92 will have been exposed and the container can be broached without difficulty. If the label should continue to unwind until the line 91 (FIGURE 4) is reached, which coincides with the edge 100 (FIGURE 2) of the reinforcing strip 78, the label will separate from the reinforcing strip 78 leaving the latter firmly secured to the container bridging the butt joint 58 and radially restraining bursting of the container along the butt joint which might otherwise occur due to the gas pressure within the container 10. As can be seen in FIGURE 4, the label inner ply 64 may begin to split thickness-wise at the line 98 if the adhesive bond between the kraft paper of the label and the kraft paper of the reinforcing strip is stronger than the resistance of the kraft paper of the label inner ply 64 to layering. Thus a fraction 64' of the inner ply beyond the line 98 may remain adhered to the body 30 and reinforcing strip.

As noted in the instructions on the portion 92, the contents may be removed from the container 10, after the label has been unwound by striking or depressing the exposed perforation line 56 on a counter-top edge, or with a thumb or the like whereupon the container body and inner liner split or burst spirally along the perforation line exposing the biscuit patties or other contents for removal.

The inner liner 32 has been found to split more coincidentally with the body along the line 56 when the perforations 60 are cut into the body 30 from the radially inner surface thereof than when the perforations 60 are cut into the body from the radially outer surface thereof and so the former procedure is pereferred over the latter.

It should now be evident that the relatively narrow reinforcing strip 78 effects a saving of material since it does not envelop the container body and because it remains in place on the body as the label is removed. Due to the fact that the uncut body regions 102 between the perforations 60 are strong enough to hold the line 56 along which the container will be broached, in a closed condition both before and after the label is removed with no additional radial restraint or protection being necessary and because the reinforcing strip 78 prevents container rupture along the butt line 58 both before and after the label is removed, a relatively thin label can be used compared with those necessary on prior art containers. This provision obviously results in a significant cost saving, yet provides a rugged and dependably easily openable container.

When the container 10 is employed in packaging unbaked biscuit dough patties which proof in the container, it has been ascertained that the container body 30 is strong enough to resist bursting before intentionally broached, both before and after the label has been removed, when the individual perforations 60 are each longer than the uncut regions 102 between perforations and when over 50 percent of the line 56 is composed of perforations 60. The bursting resistance of the line 56 can be increased, where necessary to contain higher internal pressure, by decreasing the length and/or number of the perforations 60, although such action correspondingly increases the effort required to intentionally broach the container along the line 56.

The container disclosed herein should now be recognized as having such strength and versatility that it can also be used to package such diverse products as butter; and other dairy products such as ice cream and cheese; frozen fruits, vegetables, meats and sauces; tennis balls, golf balls, badminton shuttle-cocks; electronic equipment such as electronic tubes, semiconductors, and the like. The products so packaged may have an air environment within the container or where, in order to preserve the product, it is desirable for it to be stored in a protective fluid whether gaseous or liquid or in a protective solid such as foamed in situ plastic material and whether in an environment at or exceeding atmospheric pressure, such environment can be provided in the container of the present invention.

It should now be apparent that the container 10 described herein efficiently accomplishes each of the objects of the present invention and clearly illustrates the invention's principles. Inasmuch as the embodiment shown can be considerably modified without departing from these principles, the invention should be understood as encompassing all such modifications as are within the spirit and scope of the following claims.

I claim:
1. A container comprising:
   (a) a body of semi-rigid sheet material wound to provide a tubular peripheral wall having a joint line defined where the opposite edges of said sheet material meet one another;
   (b) means defining a perforation line comprising serially interspersed serrations and uncut segments extending on said tubular peripheral wall between the opposite ends of said tubular peripheral wall and arcuately spaced from said joint line;
   (c) a narrow strip of reinforcing material secured to said tubular peripheral wall and bridging said joint line.
   (d) an outer label of relatively flexible material tightly wound around said body and having a lapped joint defined where the opposite edges of said label respectively overlap and underlap one another;
   (e) adhesive means bonding the inner peripheral surface of the label to the outer peripheral surface of the body throughout less than the full arcuate extent of each to provide a frangible connection between said surfaces and to define an adhesive free strip between said label and said body extending between the opposite ends of the body tubular peripheral wall;
   (f) a pull tab having a first portion thereof bonded to the underside of the label near one end of the body peripheral wall and extending arcuately of the body peripheral wall over and arcuately beyond said perforation line to said adhesive free strip, the pull tab having a second portion extending outwardly from the underside of the label between said underlap and overlap edges and overlying a portion of the outer peripheral surface of the label;
   (g) an end closure secured to one end of the body;
   (h) said narrow strip of reinforcing material being predisposed to remain secured to said tubular peripheral wall and bridging said joint line upon removal of the label from the body, whereby said pull tab is easily grasped by the fingers and pulled arcuately and outwardly to unwind the label from the body and thus expose the perforation line while the peripheral wall joint line remains bridged by said narrow strip of reinforcing material.

2. A container according to claim 1 further comprising an end closure secured to the opposite end of the body from said one end.

3. A container according to claim 1 wherein the body and label are each spirally wound.

4. A container according to claim 3 wherein said perforation line is helical and is parallel to said joint line.

5. A container according to claim 4 wherein the perforations of said perforation line are cut from the radially inner side of said tubular peripheral wall.

6. A container according to claim 5 further comprising an inner tubular liner of flexible, relatively waterproof and relatively oil resistant material coextensively secured to the inner peripheral surface of the body tubular peripheral wall.

7. A container according to claim 1 wherein the reinforcing strip is interposed between the radially outer peripheral surface of the body tubular peripheral wall and the radially inner peripheral surface of the label.

8. A container according to claim 1 having instructive indicia applied on the outer peripheral surface of said body tubular peripheral wall in said adhesive free strip.

9. A container according to claim 1 wherein the opposite edges of the sheet material of said body abut one another.

10. A dough package comprising a container with dough contained therein and constructed to permit said dough to be bodily removed therefrom without mutilation, said container comprising:
  (a) a body of semi-rigid sheet material wound to provide a tubular peripheral wall having a joint line defined where the opposite edges of said sheet material meet one another;
  (b) means defining a perforation line comprising serially interspersed serrations and uncut segments extending on said tubular peripheral wall between the opposite ends of said tubular peripheral wall and arcuately spaced from said joint line;
  (c) a narrow strip of reinforcing material secured to said tubular peripheral wall and bridging said joint line,
  (d) an outer label of relatively flexible material tightly wound around said body and having a lapped joint defined where the opposite edges of said label respectively overlap and underlap one another;
  (e) adhesive means bonding the inner peripheral surface of the label to the outer peripheral surface of the body throughout less than the full arcuate extent of each to provide a frangible connection between said surfaces and to define an adhesive free strip between said label and said body extending between the opposite ends of the body tubular peripheral wall;
  (f) a pull tab having a first portion thereof bonded to the underside of the label near one end of the body peripheral wall and extending arcuately of the body peripheral wall over and arcuately beyond said perforation of the label between said underlap and overlap edges and overlying a portion of the outer peripheral surface of the label;
  (g) a liner covering the inner peripheral surface of the body tubular peripheral wall;
  (h) end closure secured to the ends of the container to positively seal the dough within the container;
  (i) said narrow strip of reinforcing material being predisposed to remain secured to said tubular peripheral wall and bridging said joint line upon removal of the label from the body, whereby said pull tab is easily grasped by the fingers and pulled arcuately and outwardly to unwind the label from the body and thus expose the perforation line while the peripheral wall joint line remains bridged by said narrow strip of reinforcing material, whereby the dough can be exposed for removal by bursting the body and liner along said perforation line.

References Cited
UNITED STATES PATENTS

| | | | |
|---|---|---|---|
| 2,793,126 | 5/1957 | Fienup et al. | |
| 2,793,127 | 5/1957 | Geist et al. | 99—172 |
| 2,975,068 | 3/1961 | Fienup et al. | 99—172 |
| 3,035,753 | 5/1962 | Erekson | 99—172 X |
| 3,113,714 | 12/1963 | Stump | 229—51 |

DAVIS T. MOORHEAD, *Primary Examiner.*